United States Patent [19]

Greene

[11] Patent Number: 5,584,596
[45] Date of Patent: Dec. 17, 1996

[54] CALIPER CONTROL FOR UNIVERSAL SUPPORT ARM

[75] Inventor: H. Peter Greene, Schwenksville, Pa.

[73] Assignee: Knoll, Inc., East Greenville, Pa.

[21] Appl. No.: 258,018

[22] Filed: Jun. 10, 1994

[51] Int. Cl.$^6$ .................................................. E04G 3/00
[52] U.S. Cl. ........................ 403/55; 248/160; 294/135
[58] Field of Search .......................... 403/55; 256/37, 256/39, DIG. 3; 248/918, 280.11, 292.11, 297.11, 160; 294/135; 81/302, 342

[56] References Cited

U.S. PATENT DOCUMENTS

| | | | |
|---|---|---|---|
| 1,410,762 | 3/1922 | Kunze | 403/55 X |
| 2,094,166 | 9/1937 | Bockenhauer | 256/37 X |
| 2,521,043 | 9/1950 | Citso | 248/160 |
| 3,040,137 | 6/1962 | Simmons | 248/160 X |
| 3,168,274 | 2/1965 | Street | 248/160 X |
| 3,540,106 | 11/1970 | Goldman | 81/302 X |
| 3,584,822 | 6/1971 | Oram | 248/160 |
| 3,625,084 | 12/1971 | Low | 74/501 R |
| 3,903,812 | 9/1975 | Cowley | 108/2 |
| 3,908,560 | 9/1975 | Horner | 108/2 |
| 3,908,561 | 9/1975 | Cowley | 108/6 |
| 3,986,692 | 10/1976 | Kinoshita | 248/160 |
| 4,217,071 | 8/1980 | Ault | 294/135 X |
| 4,305,560 | 12/1981 | Ban | 248/160 |
| 4,391,352 | 7/1983 | Brown . | |
| 4,431,329 | 2/1984 | Baitella | 403/55 |
| 4,913,390 | 4/1990 | Berke | 248/176 |
| 4,949,927 | 8/1990 | Madocks et al. | 403/55 X |
| 4,964,748 | 10/1990 | McFadden | 403/55 |
| 4,976,407 | 12/1990 | Schwartz et al. | 248/118.3 |
| 5,050,826 | 9/1991 | Johnston | 248/118.3 |
| 5,072,905 | 12/1991 | Hyatt | 248/118 |
| 5,074,175 | 12/1991 | Earle | 81/302 |
| 5,104,073 | 4/1992 | Van Beek et al. | 248/118 |
| 5,147,090 | 9/1992 | Mandell et al. | 248/118.1 |
| 5,158,256 | 10/1992 | Gross | 248/118.3 |
| 5,161,760 | 11/1992 | Terbrack | 248/118 |
| 5,219,136 | 6/1993 | Hassel et al. | 248/118 |
| 5,234,186 | 8/1993 | Powell | 248/118.1 |
| 5,348,259 | 9/1994 | Blanco et al. | 403/55 X |

FOREIGN PATENT DOCUMENTS

| | | | |
|---|---|---|---|
| 122217 | 9/1946 | Australia | 81/302 |
| 1962805 | 8/1970 | Germany | 248/160 |
| 2704615 | 8/1978 | Germany | 81/302 |
| 91689 | 3/1938 | Sweden | 81/302 |
| 123218 | 1/1959 | U.S.S.R. | 81/302 |
| 681615 | 10/1952 | United Kingdom | 294/135 |
| 911419 | 11/1962 | United Kingdom | 248/160 |

*Primary Examiner*—Terry Lee Melius
*Assistant Examiner*—Christopher J. Novosad
*Attorney, Agent, or Firm*—Buchanan Ingersoll, P. C.; Carla J. Vrsansky

[57] ABSTRACT

A tension control device is provided, for example, for locking and unlocking a movable support arm for a keyboard or the like, by engaging or disengaging rotational joints having axially displaceable rotationally lockable couplings traversed by a tension line. A control, preferably a caliper, has levers pivoted on a pin, normally biased by a spring to close. The spring pulls the caliper closed; however, the caliper is arranged by linkages to clamp tension onto the line rather than to couple spring tension to the line. A front linkage isolates the spring bias from the line when closed, by folding inwardly such that tension is transmitted substantially exclusively via compression of two pivoted members of the from linkage that align nearly parallel to the line. The biasing spring is coupled between a rear linkage that operates oppositely, and a fixed point such as the caliper pivot pin. The two linkages are such that the spring has maximum mechanical advantage to hold the caliper closed when in the closed position, tension nevertheless being rigid, clamped and not resilient, for rigidly locking the support arm.

14 Claims, 6 Drawing Sheets

CALIPER CONTROL FOR UNIVERSAL SUPPORT ARM

BACKGROUND OF THE INVENTION

1. Field of the Invention

The invention relates to a manually positionable support device, especially for a work surface. The support device is movable to a desired position and held there for use. Such a support device is useful, for example, to position an electronic interface device such as a computer workstation keyboard, monitor, data tablet or the like, or simply to provide a useful surface for writing, storage or other purposes.

According to the invention, a universal joint support arm is provided with a manual control that is operated temporarily to release rotational engagement between a plurality of coupled joint elements, permitting the support to be repositioned with various degrees of freedom. The joint elements can have axially displaceable rotational engagement surfaces for a plurality of axes of rotation. Tension normally holds the rotational engagement surfaces in axial abutment, preventing relative rotation of the joint elements. The tension is changed, e.g., released temporarily by a control lever coupled to a cable traversing the joint elements, to allow the joints to disengage for repositioning the support arm. According to one embodiment, a positive locking mechanism for the cable rigidly fixes the support device at the chosen position when the control lever is released, by a lever arrangement that isolates the cable from spring tension when locked. According to another embodiment the support arm can have a plurality of elongated connecting arms coupled by such joint elements, dimensioned to permit positioning as appropriate for a user who either sits or stands.

2. Prior Art

It is important in a work environment to enable a worker to adapt the environment to his or her individual needs, including by positioning work surfaces or supported devices at a height, distance and orientation desired to best complement the worker's dimensions and preferences. It is also advantageous for reasons of comfort and to minimize repetitive motion injuries, to enable such position and/or orientation aspects to be changed readily and conveniently, and thus avoid the need to work for a long time in one position or at one precise location. The worker may desire to change any or all of the positioning aspects of the support from time to time.

Various repositionable structures have been developed for making adjustments in the height, extension, lateral position, orientation and other positional aspects of a support surface relative to a base such as a desk, supporting pedestal, mobile foundation device or other structure. Repositionable structures are useful as supports for electronic interface devices such as keyboards, display monitors, data pads, mouses or other pointers, and also for desks, drafting tables, ready-access storage bins, etc. As appropriate, the structures may be configured for the specific use, e.g., with wrist supports for a keyboard, or with clamps for holding down the supported device. Typically, the structures have a plurality of arm members that are coupled so as to be relatively movable by sliding or relative rotation.

The supported device normally must remain secure and stationary against forces produced when the device is positioned at the desired location. Flexible arm members thus are undesirable, particularly for supporting devices such as keyboards, which must be supported against forces produced by the manual activities of the user. However, in the case of a keyboard, the primary force to be resisted is the weight of the user's hands and the force of finger motions. Two or more rigid members typically are coupled in an articulated manner, and means are provided to lock the articulated members relative to one another against expected forces. It is possible to include springs in such supports for bearing part of the weight on the support when the locking means is released, and thus to make the support lighter when it is repositioned. It is also possible to combine some joints that lock and others that do not.

The typical form of locking mechanism for articulated members is frictional. For example, as in U.S. Pat. No. 4,431,329—Baitella, in a rotational joint having axially abutting plates attached to the respective arm members, a threaded tightening bolt with a lever handle can be used to controllably urge the plates into frictional engagement. A pivoting lever can be used instead of a bolt and lever to exert axial pressure, for example as in U.S. Pat. No. 4,976,407—Schwartz et al. Another alternative for a rotational joint is to use a bolt and lever handle or the like circumferentially to shorten a split or C-shaped collar, as in U.S. Pat. No. 4,964,748—McFadden, thereby exerting radial rather than axial pressure tier frictional engagement. Each of these alternatives provides a rigid connection if the frictional engagement is tight enough.

There are several drawbacks to known frictional locking mechanisms. If two or more rotational joints each require a frictional adjustment, each rotational coupling must be arranged to lock individually and typically independently of the other rotational couplings, which is cumbersome. In the above McFadden patent, two adjacent joints on the opposite ends of an arm can be tightened or loosened simultaneously using a double-ended tightening arrangement, but only in one rotational axis per joint. For a series of rotational joints between articulated members proceeding from a proximal or fixed end to a distal end carrying a work surface, especially a series of joints having non-parallel rotation axes, repositioning the work surface at the distal end may require numerous steps. A given rotational joint is loosened after envisioning the positioning effect of this rotational joint on the eventual position of the distal end, then the associated articulated member is moved and the joint is re-tightened. Proceeding, for example, from the proximal end to the distal end, attention is required at each rotation axis of each joint.

A universal joint arrangement for a support wherein two or more universal joints are provided between a supporting structure such as a desk and a support platform for a keyboard or the like would advantageously provide a versatile positioning support in that the ultimate position of the support could be arranged at any point in a three dimension span of movement, and at any orientation. Furthermore, the articulated connecting arm members of a support arm comprising universal joints would be subject to various arrangements even while holding the supporting platform at a given position, providing further versatility. However, the need to individually lock each rotation axis of each joint when positioning such a device would be unduly complicated. It is known to provide a universal joint in the form of a ball and socket with an adjustable compression fitting. A ball on one member is affixed in a socket by a collar threaded onto the attached member such that the collar can be tightened to lock the joint frictionally. This is a form of single control applicable to three axes of freedom, but also requires attention to each of the individual joints.

Users of frictionally fixed support platforms often do not tighten the frictional mechanisms to the point that they are fully rigid. Instead, the joints are left firm but not so tight as to preclude movement of the platform by exertion of some force. A looser coupling allows repositioning without attention to the lever or other tightening device, but also less securely holds the support platform. In a universal joint configuration, which inherently has many degrees of freedom, the difficulty in obtaining sufficient security of attachment is compounded.

For all these reasons, plural successive universal joints between articulated members are not likely candidates for a keyboard support or the like that a user will want to reposition conveniently and often.

SUMMARY OF THE INVENTION

It is an object of the invention to provide an improved apparatus for controlling the application of tension to a control line.

It is also an object to provide an optimal means to readily and temporarily free a series of universal joints along an elongated support arm to permit positioning, and locks the joints at whatever position they are set.

It is an object of the invention to optimize the structure of a support arm of the type having a surface for supporting equipment, by providing a universal joint locking mechanism supporting the surface at any desired position and angle in a range.

It is another object to provide a control for a support arm as described, that is placed on the repositionable part and is arranged such that a user can readily and temporarily free a series of universal joints along an elongated support arm to permit positioning, and locks the joints at whatever position they are set, simply by grasping, manipulating and then releasing the control.

It is a further object to provide an improved support for workstation keyboards, monitors and the like, to be supported at a convenient but very easily changed position relative to a base structure such as a desk.

It is another object to provide a structure that is rendered rigid with tension and flexible in the absence of tension, that is particularly adapted to the problem of supporting a work surface for a keyboard or the like.

Surface supports are improved by employing at least one, and preferably a series, of universal joints having axially abutting rotational engagement surfaces that are biased by tension to engage, but are readily controllable to separate axially for allowing rotation on mutually perpendicular rotation axes, such that an articulated support structure can go limp when changing the position and orientation of articulated arm members, and becomes rigid when the control is deactivated to re-engage the frictional surfaces with the recurrence of tension.

These and other objects and aspects of the invention are provided by a movable support arm that positions a support surface for an electronic interface such as a keyboard, display monitor, pointing device or the like, or simply for a work or storage surface. The support surface is positioned relative to a base structure such as the underside of a desk top, a stationary pedestal or a movable base unit. A series of articulated members between the base member and the platform are coupled by joints having interfitting shafts and sleeves on two mutually perpendicular axes, forming universal joints. The joints have axially facing rotational engagement surfaces that can be engaged to lock the joint or disengaged for rotation. The rotational engagement surfaces can be frictional, provided with complementary axially protruding teeth or splines, or can have radially protruding complementary splines. The engagement surfaces are displaceable toward and away from one another, preferably being biased to separate by a compressible washer or a spring coupling providing an axially limited extension.

A tension means normally compresses the joints against any bias from the compressible washer or the like, and fixes together the engagement surfaces. The tension means can comprise a line such as a cable or chain, traversing the joints. The line can apply tension via a spring, but preferably applies tension via a locking control having a compound leverage arrangement that bears positively against the line in the locking position, and is operable against spring pressure to relieve tension on the line when operated. The tension means causes a plurality of joints along the support arm to lock rotationally, and thereby to hold the supporting platform rigidly at a given position.

According to an inventive aspect, the manually operable locking control includes a lever handle, preferably in the form of a caliper arrangement with two centrally pivoted lever handles. The lever or caliper can have a fixed pivot point on the support arm, e.g., under the support surface. A first linkage has a member with an end coupled at a connection point to the line, this member being pivoted at a point movable laterally toward and away from the line by manual action of the associated lever handle to thereby displace the line toward or away from the fixed pivot point. A second linkage similarly has a member with an end coupled at a connection point to a tension spring, the member of the second linkage being pivoted on the lever handle at a point opposite from the fixed pivot point. The connection points for the line and the spring move generally opposite one another as the lever handle pivots on the fixed pivot.

The members of the first and second linkages provide a compound leverage arrangement relative to an operational line including the fixed pivot and the cable. This occurs because the force exerted in the direction of the fixed pivot by or against the cable, or by or against the spring, varies with the extent to which the respective member of the linkage is disposed perpendicular to operational line (where leverage is greatest), or parallel to the operational line (where leverage is least).

Preferably, when the control is in a locking position, the member of the first linkage attached to the cable is at or nearly parallel to the operational line, and the member of the second linkage attached to the spring is at or nearly perpendicular thereto. At that position, spring force holding the control in the locked position is greatest. However, the spring force is isolated from the cable because tension on the cable is borne substantially completely by compression of the linkage of the first member. When the control is moved manually to the unlocking position, the user's leverage against the spring increases from an initial minimum in the locking position to a maximum when the control is unlocked and tension on the cable is released. The control thus is relatively easy to operate and when locked provides a rigid and positive application of tension against the cable.

The control extends the length of the line traversing the joints to release tension. This disengages all the axially displaceable rotational engagement surfaces and frees the joints simultaneously. The support platform can be moved freely to a new position anywhere in a three dimensional range, as well as tilted, etc. The control is released at the new position to again hold the platform rigidly in place.

Preferably, the rotational engagement surfaces face axially toward one another and are engaged with application and disengaged with release of tension. Other specific arrangements are also possible, for example with other cable arrangements or other tension varying means such as a pneumatic action for controllably locking and unlocking the respective rotational couplings. The controllable mechanism can comprise means to extend a tension spring or to compress a compression spring. The line can traverse a subset of the joints, and some of the joints can be controllable while others are not.

Preferably, the line is arranged to pass centrally through each joint of a series of universal joints, i.e., along their respective rotation axes. This prevents tension on the line from leading to angular deflection of the joints and makes the repositioning action very free and smooth. In a preferred embodiment, the line traverse a distal joint that it does not influence, which is a frictional rotational coupling having an axis perpendicular to the support surface. The line can be coupled, for example, to a fixed point on a proximal section of the connecting arm, which in turn is affixed via a slide fitting on the underside of a desk top.

One or several connecting arms lead to the platform support at the distal end, where the universal joint is coupled to the platform at a fitting permitting rotation on an axis perpendicular to a plane of the platform. Preferably, the rotational displacement of the joints defines a substantial range, but is limited against turning fully through 360°, so the cable cannot be wound up. The keyboard can be raised, lowered, tilted, transversely repositioned or caused to turn to the left or right as desired, and locks rigidly for use wherever it may be placed upon reapplication of tension by release of the control. The slide joint at the proximal end of the arm and the fitting permitting rotation of the platform are not influenced by the locking mechanisms, are simply snugly attached such that they can be manipulated against the inherent friction of these joints.

At least one connecting arm section with universal joints at opposite ends is provided. In embodiments having two or more connecting arm sections, not only are the position and orientation of the platform subject to movement and locking, but the relative positions of the connecting arm sections leading to a given platform position and orientation are subject to variations as well. Accordingly, the arm sections can be kept out of the way under the desk top, or extended substantially, for example to permit a keyboard to be positioned for use by a person who is either sitting or standing. For compact storage of the connecting arms, an embodiment is provided wherein adjacent connecting arm sections are coupled by a universal joint with a curve that enables the connected section to be turned opposite one another by 180°.

A number of additional aspects of the invention will be apparent from the following description of specific preferred examples by which the invention can be embodied.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
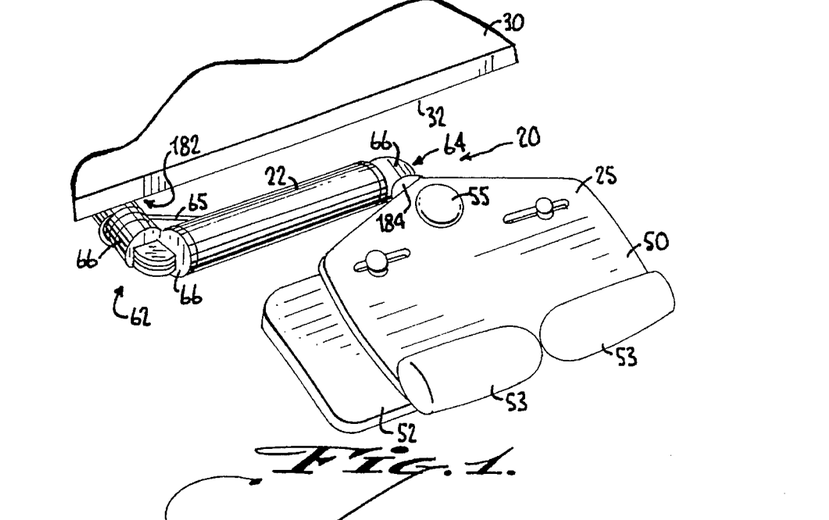
FIG. 1 is a perspective illustration of a support arm for movably positioning a work surface relative to a base structure, according to the invention.
Figure 2:
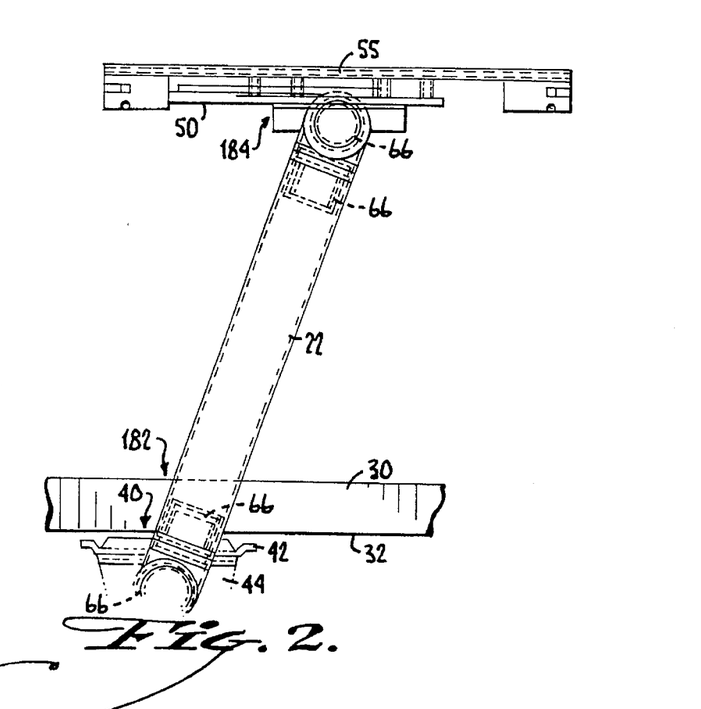
FIG. 2 is a front elevation of the support arm of FIG. 1.
Figures 3, 4:
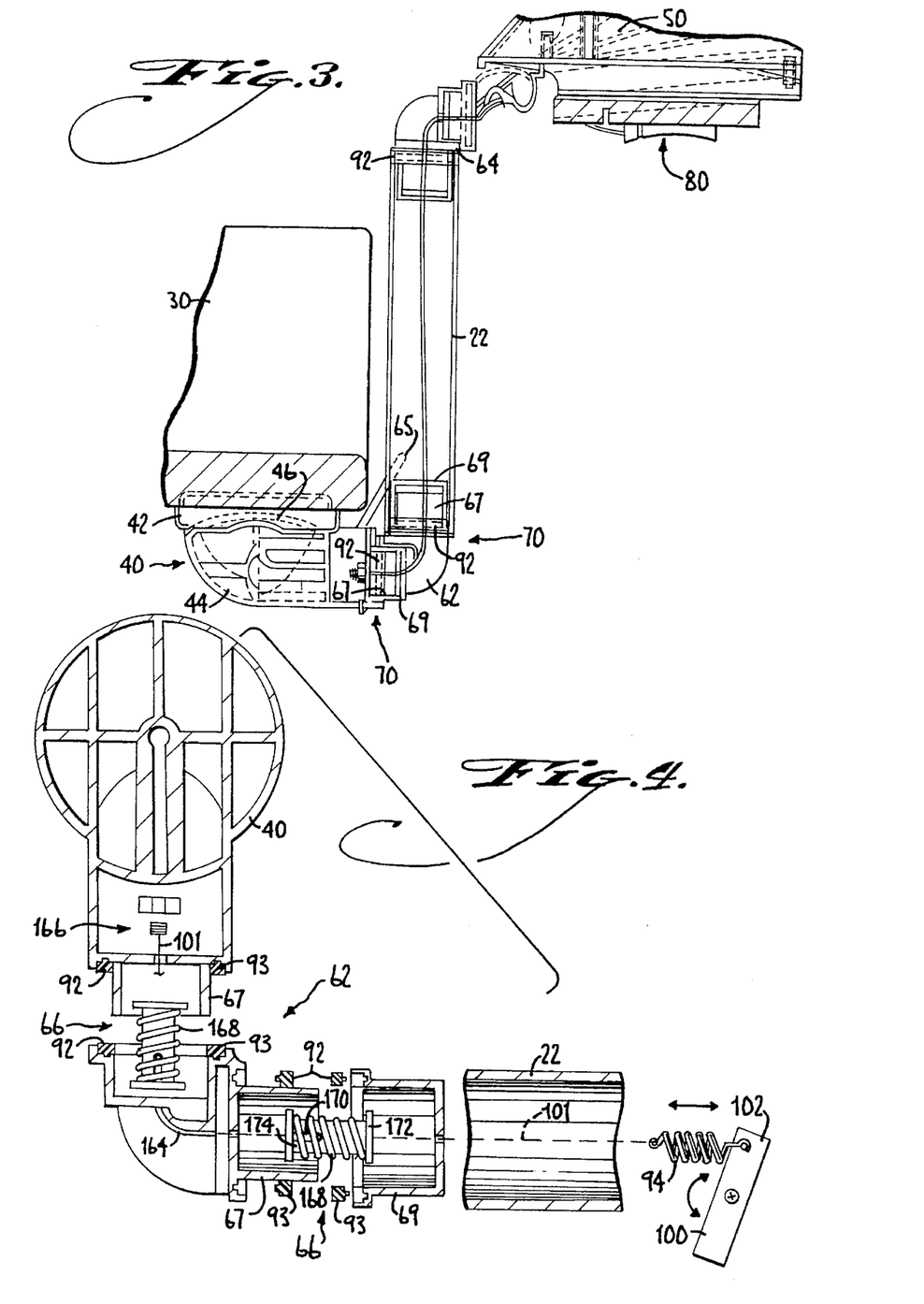
FIG. 3 is a side elevation thereof, partly in section.
FIG. 4 is an exploded perspective view of a preferred embodiment of a locking joint, namely the proximal joint.

A support arm 20 according to the invention is shown in FIGS. 1–3, for movably positioning a work surface 25 relative to a base structure 30. The work surface can be arranged to support various items or simply to provide an available surface on which to work. The illustrated embodiment is configured to support an electronic interface device such as the keyboard of a computer work station, typically coupled to a processor via a flexible cable that can be run along support arm 20 (only arm 20 and base structure 30 being shown). Support arm 20 movably positions work surface 25 relative to a structure such as the horizontal underside 32 of a table top, desk top or the like, but also could be attached to a vertical or other surface, to a floor mounted base unit or to a movable base unit providing sufficient ballast. Support arm 20 is intended to permit a user to place work surface 25 at any position and at any orientation within a three dimensional range of movement defined by a series of articulated members coupled by joints.

In the embodiment shown, a base member 40 is attachable as shown in FIGS. 2 and 3 to the underside 32 of the desk top or other base structure 30. Several variations for base member 40 are described herein and shown in the drawings, wherein the same reference numbers are used throughout to identify corresponding structures of the respective embodiments. Base member 40 preferably provides for a rotational displacement around a vertical axis, a horizontal axis, or can be arranged to provide a linear displacement to permit the support arm and supported keyboard or other article to be pulled out for use or stored, for example under a desk top. Combinations of these alternatives are also possible.

As shown in FIGS. 1–3, base member 40 has a portion 42 that is directly attached to the underside 32 of base structure 30, for example being attached by screws, and a portion 44 that is movable relative to the attached portion 42. For example, portions 42, 44 can comprise a pin/slot arrangement 46, wherein a pin on one of the portions 42, 44 is slidable in a slot in the other. Thus, base member 40 forms a joint that is rotatable around the axis of the pin, and the axis can be relocated by moving the pin along the slot. The slot can be arranged perpendicular to the edge of the desk top or support, parallel to the edge, or at another angle (e.g., diagonal), to provide the desired range of displacement.

In the example as shown for supporting a keyboard, a platform 50 defines the work surface 25 and preferably is dimensioned to exceed the size or footprint of the keyboard or the like to be carried on the platform. Platform 50 can include attachment devices, clamps or sockets, stops or the like that engage the device to be carried, which is helpful because the platform can be varied in orientation. The platform can include additional devices such as one or more supplemental shelves that slide under the platform or can be pulled out, e.g., to provide room near the keyboard for operating a mouse, trackball or other pointing device. Movable or adjustable features such as slots for repositioning the stops, movable wrist supports or the like can be included as well.

At least one connecting arm 22 is disposed between the base member 40 and the platform 50, and at least one joint 62, 64, coupling the connecting arm 22 to one of the base member 40 and the platform 50, has rotatable couplings 66. In the embodiment of FIGS. 1–3, rotatable couplings are provided at both ends, namely between the connecting arm 22 and the base member 40, and between the connecting arm 22 and the platform 50. Each of these couplings 66 is either rotationally locked or is freely rotatable, depending on the operation of a locking means that is discussed in detail below.

Connecting arm 22 can be longer or shorter, depending on the particular embodiment of the support. Likewise, the extensions of the stubs of the joints (i.e., the distance between the respective axis of rotation and the end of the adjacent connecting arm) can be longer or shorter. In the embodiment of FIGS. 1–3, connecting arm 22 is about sixteen inches (41 cm) in length and the stub length from the pin/slot rotation axis to the longitudinal axis of connecting arm 22 is about four inches (10 cm). Connecting arm 22 preferably can be moved upwardly past the edge of the desk or table 30. Accordingly, the front end of the pin/slot travel is mounted close enough to the edge of the desk 30 to provide clearance.

The range of rotation of the respective joints 62, 64 need not be 360°, depending on the particular use of the support. For example, in the embodiment as shown in FIGS. 1 and 2, proximal joint 62 is to the left of platform 50 at desk top height and can rotate up, e.g., for the convenience of a standing user. It may be sufficient in those circumstances to enable arm 22 to rotate only up to vertical, and a suitable rotational stop abutment (not shown) can be provided in the horizontal rotation axis of joint 62. This does not restrict the support operationally, but prevents the support from being wound around repeatedly in the same direction, which could affect the tension applied by the control means as discussed below.

As shown in FIG. 1, one or more of the joints 62, 64 can be provided with a spring rod or similar resilient retaining means bridging across the joint to provide a home position. In FIG. 1, a spring rod 65 is attached to the proximal side of proximal joint 62, for example with the spring rod wrapped around the proximal stub of joint 62 and having a spring end that protrudes radially inwardly into a hole in the stub. The opposite end of the spring rod extends substantially horizontally at rest and is disposed under connecting arm 22. When the user releases the support arm, the spring can bear all or part of the weight of the platform and connecting rod, such that the platform cannot drop inadvertently when the support arm is released. The spring rod can simply rest under connecting arm 22, such that arm 22 can be lifted away, or can be attached to arm 22. If attached to arm 22, the point of attachment can be variable, for example by capturing the spring rod under a sliding collar, for varying the resilience of the spring rod Joints 62, 64 each provide for at least some rotational movement along two mutually perpendicular axes, thus substantially forming a universal joint. In addition, platform 50 is coupled to the endmost stub of the distal joint 64 via a rotational coupling having a rotation axis perpendicular to the plane of platform 50. Joints 62, 64 include two rotational cylinder and sleeve configurations, with in each case a male cylindrical part 67 on one side fitting rotatably into a female cylindrical part 69 on the other side. Thus, the embodiment of FIGS. 1–3 has a number of degrees of freedom, including: translation of arm 20 relative to desk 30 via the pin/slot 46; rotation of base member 40 about the pin; rotation of connecting arm 22 about a horizontal axis corresponding to the stub part of base member 40 (a circular arc in FIG. 2); relative rotation at the proximal or distal end of connecting arm 22; rotation around the distal stub of distal joint 64 (lateral tilting of platform 50 in FIG. 3); and rotation of platform 50 about an axis perpendicular to its plane.

In the embodiment shown, rotational couplings 66 for rotation around the axis of connecting arm 22, are provided at both ends of connecting arm 22. These are to some extent redundant, but are preferred so that it is not necessary to rotate connecting arm 22 in any particular direction when repositioning platform 50 where desired, which would be necessary if connecting arm 22 was rotationally fixed to the stub of one of the proximal and distal joints 62, 64. Instead, in this embodiment, universal joints having rotatable couplings 66 for mutually perpendicular rotation axes are provided at both ends.

With its many degrees of freedom, support arm 20 is quite versatile with respect to the possible positions in which platform 50 can be disposed, within a range of positions and orientations permitted by the respective couplings. However, locking means 70, an embodiment of which is shown in FIG. 4, are normally active to lock at least a subset of the joints that couple platform 50 to the desk top or other base structure 30. Locking means 70 cause the rotatable couplings 66 to engage, i.e., to become rotationally fixed, thereby maintaining whatever angular relationship then exists at the respective joints, namely between the connecting arm 22, base member 40 and the platform 50. In this manner, the position and orientation of platform 50 is fixed and stable for working.

Locking means 70 preferably acts on both mutually perpendicular rotational couplings 66 at the proximal and distal joints 62, 64. It is less critical to lock pin/slot joint 46 (against translation or rotation) and the joint 55, aligned perpendicular to the plane of platform 50. These joints are not subjected to forces in regular use that would tend to cause the position and orientation of platform 50 to change. Accordingly, joints 46, 55 can be relatively free, for example being frictionally snug but relatively easily overcome to cause rotation or displacement.

Locking means 70 is coupled to a manually operable control means 80, for simultaneously releasing the locking means in each of the locked axes of rotation, thus causing support arm 20 to go flaccid, whereupon platform 50 is movable to any desired position and orientation in the range of movement provided. When locking means 70 is re-engaged, the controlled joints 62, 64 become rotationally locked as to each of their rotation axes, and support arm 20 becomes rigid to support platform 50 at its new position.

In the embodiment of the invention shown in FIG. 4, locking means 70 includes relatively movable rotational engagement surfaces 92, that are fixed on the relatively rotatable parts of each rotatable coupling 66 and can be placed in abutment or engagement to prevent rotation or spaced slightly from one another to permit rotation. For example, engagement surfaces 92 can face one another axially along each of the two axes, and be provided with means 94 that applies tension to draw the engagement surfaces 92, axially together, and means 100 that relieves the tension to allow relative rotation between the connecting arm 22 and either one of the base member 40 and the platform 50.

There are several possible arrangements for the rotational engagement surfaces. These surfaces can be frictional, can be provided with complementary axially protruding teeth or splines, or can have radially protruding complementary splines. The engagement surfaces also can be formed directly in the joint members or provided by inserted means such as the annular rings shown in FIG. 4, which are rotationally fixed to their respective side of the joint.

Figure 9:
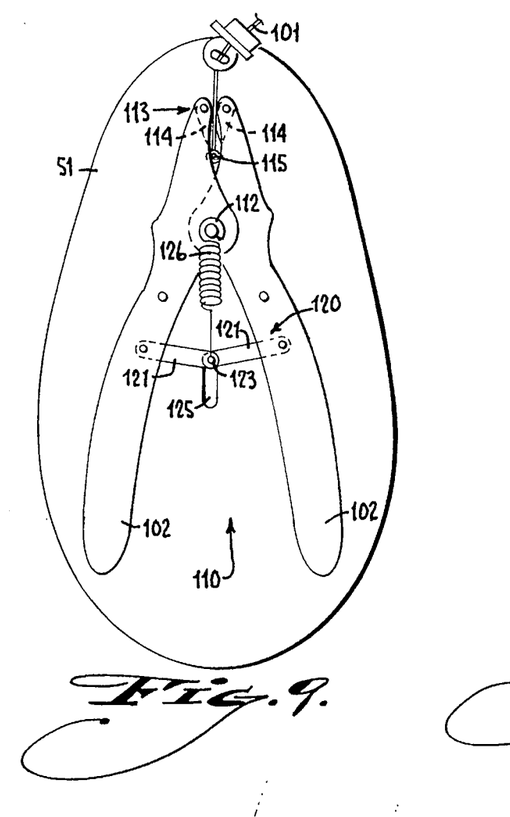
FIGS. 9 and 10 are plan views showing a preferred caliper arrangement for selectively rendering the support rigid or flaccid, respectively.
Figure 10:
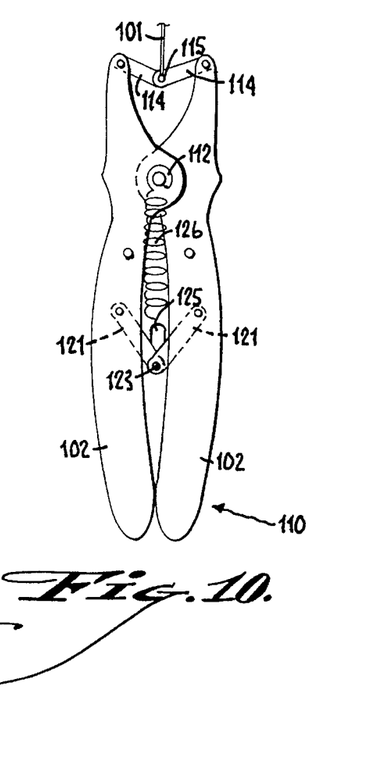

In the embodiment of FIG. 4, the means for applying tension is shown schematically to comprise a cable or line 101 that is loaded by a spring 94 to apply tension, and a lever means 102 is coupled to the line controllably to oppose the spring and thereby release tension on the line. Line 101 runs through the joint 62, 64, as explained more fully hereinafter, to effect this controllable tension. A preferred tension control is shown in FIGS. 9 and 10, comprising a spring connected to a linkage providing compound leverage and a cam-like positive lock in the closed position, and is discussed in detail below.

In FIG. 4, the tension control line can be controlled by a lever 102 coupled to the line, preferably at a point closer than joints 62, 64 to the spring 94 or other means to apply tension that is also coupled to the line, but also potentially at the end of the spring opposite the line. The lever 102 or the like can be disposed proximally or distally of joints 62, 64, but is advantageously placed at the distal end, where it can be operated while grasping the platform.

Figure 5:
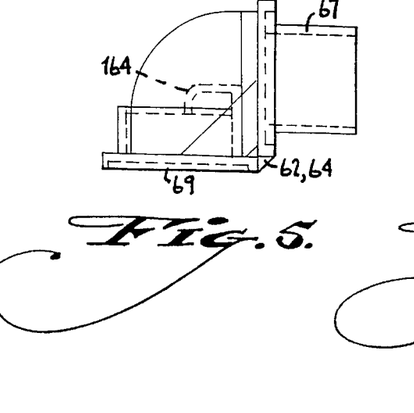
FIG. 5 is an elevation view showing a preferred joint member, e.g., for the proximal or distal joint.
Figure 6:
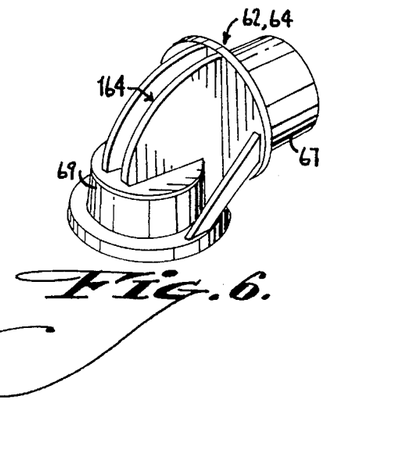
FIG. 6 is a perspective view of a two dimensional rotational coupling.
Figure 7:
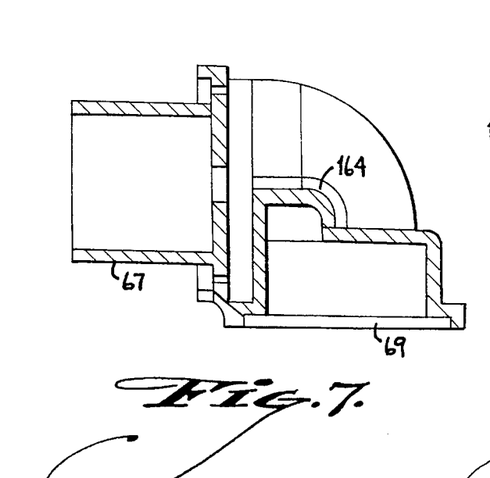
FIG. 7 is a sectional view of the joint part of FIG. 6.
Figures 11, 12:
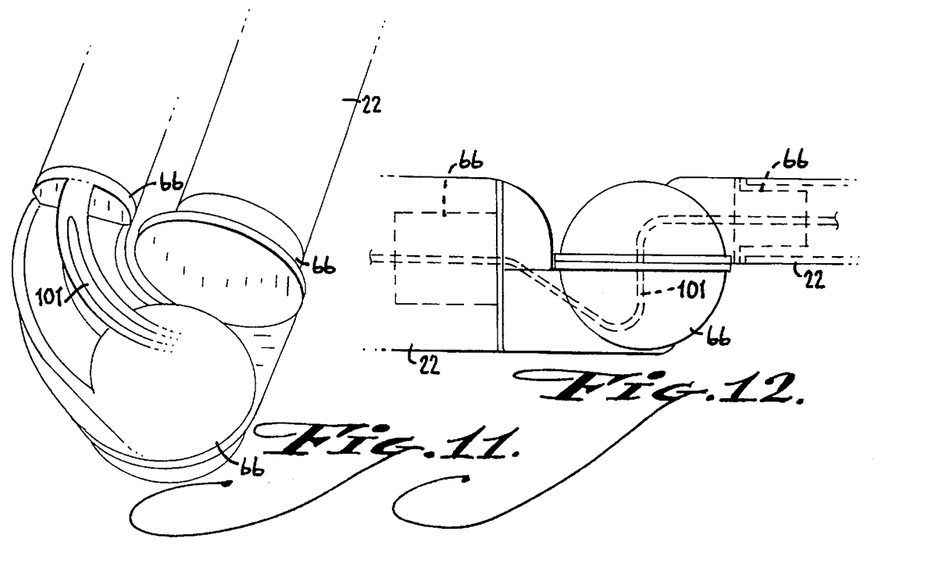
FIG. 11 is a side elevation view of an alternative embodiment having a joint with an offset profile.
FIG. 12 is an elevation view of the embodiment according to FIG. 11, showing routing of the cable through the rotational centers.

A particular structure for joints 62, 64 is shown in FIG. 4 in an exploded view, and in FIGS. 5–7. Although the stub structures of the different alternative embodiments for joints 62, 64 are somewhat different, the rotational locking and unlocking structures can be alike. Such locking and unlocking structures are shown generically in FIGS. 5–7, according to a preferred embodiment. The joint members generally define a right angle such that the two rotation axes of each are perpendicular to one another as needed in a universal joint. The joint member of FIGS. 5–7 has a short elbow between a male part 67 and female part 69. It is also advantageous in certain instances to provide an offset in a joint element, as discussed below with reference to FIG. 11. In FIGS. 5–7, each elbow or joint member has a male part and a female part, and in FIGS. 1–3 the ends of connecting arm 22 are both female. It would likewise be possible to make both ends of the joint member male or both female, or otherwise to vary the specific gender of the couplings, provided of course that the interfitting stub parts were configured in a complementary manner.

The exploded view of FIG. 4 shows an inventive aspect wherein friction surfaces 92 are provided on annular plates 93, arranged to bear axially against one another under tension from line 101. Annular plates 93 are rotationally fixed relative to their respective male or female coupling parts 67, 69, for example by interengaging patterns of axially protruding pins and holes on the annular plates 93 and the coupling parts 67, 69. On the axially facing surfaces of annular plates 93, friction surfaces 92 provide a means by which the facing annular plates 93 are rotationally fixed to one another. For example, the friction surfaces 92 can be formed by a series of axially protruding radially elongated grooves, splines or the like, which fit into corresponding grooves, splines, etc. on the opposed annular plate 93. Resilient means 168 preferably are interspersed between the interconnected male and female coupling parts 67, 69, and urge friction surfaces 92 axially apart. The resilient means 168 is normally loaded by line 101, which applies tension such that the friction surfaces 92 are normally in contact and arm 20 is rigid. When tension is released, resilient means 168 slightly spaces annular plates 93 apart, and the couplings 66 are free to rotate.

Only a minimal distance of axial displacement preferably is needed to rotationally disengage facing plates 93. For example, the splines or grooves in plates 93 can be about ¹⁄₁₆ inch (1.6 mm) in depth, this amount of axial displacement being provided by the resilient means in each joint. Resilient means 168 can be, for example, a compressible washer such as a waved or domed washer (not shown). A compressible washer of this type has a sufficient range to separate the facing plates 93 upon relaxation of the tension means, and has the advantage that its maximum spacing is inherently and rather accurately limited.

Figure 8:
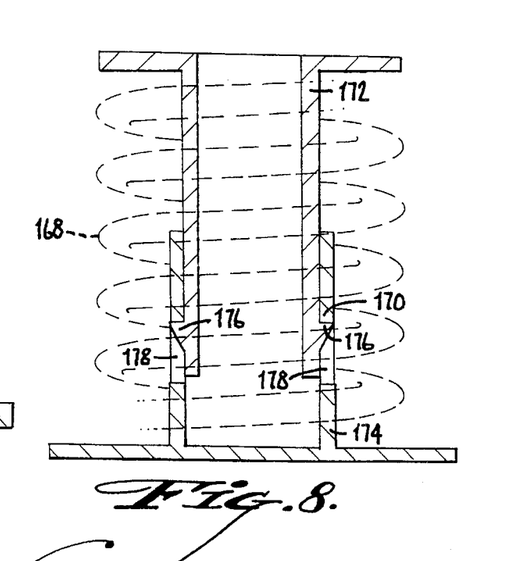
FIG. 8 is a sectional view of a spring part for biasing open the rotational couplings of a joint as in FIGS. 6 and 7.

Limiting the maximum opening displacement of the engagement surfaces of each rotational coupling is helpful so that one or more joints along a series of joints that have relatively stronger resilient means 168 cannot employ too large a proportion of the displacement of the cable, causing other (weaker) resilient means 168 to remain compressed and their rotational couplings to remain locked. FIG. 8 shows an alternative means by which the axial opening displacement of a rotational coupling can be limited, in connection with a helical spring. According to this embodiment, resilient means 168 has a pair of telescoping tubes 172, 174, that are urged apart by a helical compression spring that bears outwardly against the flanged ends of tubes 172, 174. Tubes 172, 174 are placed within the space between the male and female parts 67, 69 of rotational couplings 66, as shown in FIG. 4. A stop structure 170, shown in FIG. 8, limits the extent to which the spring can force tubes 172, 174 apart. Tube 172 is provided with radially protruding axial stop pins 176 that interact with axially elongated slots 178 in mating tube 174. Tubes 172, 174 can be snapped together in the compression spring, which bears outwardly on the flanges (and against male and female rotatable joint parts 67, 69), with the axial separation being limited as pins 176 reach the ends of slots 178.

Preferably, the resilient means 168 simply comprises a compressible domed or waved washer, extensible to a distance just sufficient to separate the friction surfaces 92 of the joints 62, 64. The control means provides sufficient slack in cable 101 to exceed the sum of the opening displacements of each of the controlled rotational couplings traversed by cable 101. In the embodiment shown, cable or line 101 traverses four rotatable couplings 66, each preferably having a resilient means 168 therein. Assuming a 1/16 inch (1.6 mm) depth contour in the rotational engagement surfaces 92, the tension relief on line 101 needs at least ¼ inch (6.4 mm) of travel, and preferably has about ⅜ inch (9.6 mm) of travel. The tendency for the tension relief line or cable 101 to distribute the slack that is provided by control means 80 unevenly among joints 66 is thus prevented by resilient means 168 and no one joint remains too tight or too loose. Furthermore, undue slack is avoided all along line 101, minimizing any danger of kinking of line 101.

Another inventive aspect that prevents kinking and is shown in FIGS. 5–7 is the line guide 164 provided by the structure of the joint members along internal surfaces passing around the right angle or elbow. Line guide 164 traces substantially a smooth arc causing line 101 to extend smoothly to and through the center of each joint 66. The line guide is formed as a semi-cylindrical channel along the inside wall of the elbow, being formed between reinforcing sidewalls that extend between the male and female cylindrical parts 67, 69 of the joint. Should excess slack occur in cable 101, the channel depth of guide 164 keeps the cable in place between the channel walls.

Male and female coupling parts 67, 69 have been described as cylindrical, and in the embodiments shown are substantially cylindrical. They can also be at least somewhat conical, or shaped in other particular ways that permit relative rotation. According to a preferred embodiment, coupling parts 67, 69 are slightly conical, for example having sidewalls disposed at about 1° to a line parallel to the respective rotation axis. Thus tension on line 101 tending to shorten the overall length defined by the serially coupled joints 62, 64 has the further effect of more snugly engaging together the adjacent interconnected parts 67, 69. This improves the stability of support arm 20 and its usefulness as a support for a keyboard or other device.

In the embodiment shown in FIG. 4, line 101 is attached to support arm 20 at the proximal side of proximal joint 101, and extends through joints 62, 64 to the distal side of distal joint 64. The point of attachment can have a threaded bolt attached to line 101, used to adjust the extent of tension exerted by the spring means 94. On the distal side in the embodiment shown in FIG. 4, the line is attached to an extension spring 94, which applies tension. Control means 80 is operable to further extend spring 126 when releasing tension on line 101, and can comprise a pivotable lever mounted to platform 50 for this purpose.

According to FIG. 4, spring 94 exerts the ultimate tension for locking the rotational couplings. This has the disadvantage that sufficient pressure on platform 50 can cause spring 94 to extend and release one or more of the rotational couplings. FIGS. 9 and 10 illustrate a preferred embodiment wherein a mechanism is provided whose operation is biased by a spring 126 into the locking position, but in the locking position the tension on the cable 101 is rigidly clamped. Furthermore, this is accomplished using a linkage mechanism that provides compound leverage tending to exert greater force holding the locking means closed when in the locking position, and greater force for displacing spring 126 when moved toward the open or unlocking position.

Referring to FIGS. 9 and 10, the manually operable locking control includes at least one lever handle 102, and preferably two lever handles 102 coupled to form a caliper 110. The lever handles or levers 102 pivot relative to one another on a pivot pin 112 that is preferably fixed on the support arm, e.g., under platform 50. A first linkage 114 has at least one, and preferably two symmetrically arranged members 114. One end of member 114 is coupled at a connection point 115 to line 101, member 114 also being pivoted on the associated lever handle at a point that is movable laterally toward and away from the line by the manual action of pivoting the lever handle around fixed pivot 112.

In the caliper arrangement shown, two members 114 are pivoted to the opposite levers 102 of caliper 110. If only one lever is used, it is necessary to guide connection point 115, for example using a pin in a slot (not shown) or a similar means that causes connection point 115 with line 101 to be displaced toward or away from the fixed pivot 112. In the dihedral caliper arrangement shown, the two members 114 of first linkage 113 inherently move along the operational line defined along the centerline of caliper 110. However, it is necessary that linkage members 114 be retained against moving farther toward line 101 than a position in which they are aligned parallel, e.g., via a spring or the like (not shown), so that connection point 115 moves toward fixed pivot 112 for locking and not toward line 101.

A second linkage 120 is coupled to the caliper legs or levers 102 on the opposite side of fixed pivot 112 from first linkage 113. Second linkage 120 similarly has at least one member 121, and preferably two centrally pivoted members 121 as shown. Members 121 of second linkage 120 are pivoted to caliper legs 102 and to one another at a connection point 123 coupled to one end of tension spring 126, whose opposite end is coupled to a fixed point, preferably fixed pivot 112.

First and second linkages 113, 120 are on opposite sides of the fixed pivot point and in the embodiment shown operate in opposite directions as caliper legs 102 are moved relative to one another. The distance between fixed pivot 112 and the first and second linkages 113, 120, as well as the length of members 114 and 121 are such as to provide somewhat greater travel for spring connection point 123 than for cable connection point 115, the latter moving about ⅜ inch (9.6 mm) in the example shown.

Caliper 110 tends to stay aligned with cable 101 when locked as shown in FIG. 9, due to the tension exerted between point 115 and the point at which cable 101 is guided, preferably centrally, through the frictional pivot coupling 55 with platform 50. When unlocked as in FIG. 10, caliper 110 could become misaligned, thereby exerting tension on line 101 or causing members 114 of the front linkage 113 to pass their point of parallel alignment. To keep caliper 110 aligned to the path of cable 101, a pin at either or both of connection point 115 and connection point 123 protrudes into a guide slot in the mounting area aligned to the cable and to fixed pivot 112. In the embodiment shown, slot 125 guides a pin at connection point 115.

The members 114, 121 of the first and second linkages 113, 120 provide a compound leverage arrangement relative to the operational line including fixed pivot 112 and cable 101. This occurs because the force exerted in the direction of fixed pivot 112 by or against cable 101, or by or against the spring 126, varies with the extent to which the respective member 114, 121 is disposed perpendicular to the operational line or parallel to the operational line. Leverage is greatest at second linkage 120, for example, in FIG. 9, because members 121 are nearly in parallel alignment. In this manner, the closing force exerted by spring 126 is greatest when the caliper is closed and the support arm is locked.

However, in FIG. 9, the force of spring 126 is not applied substantially to cable 101, because members 114 of first linkage 113 are folded nearly parallel to the operational line, effectively isolating the closing force of spring 126 from cable 101. Nevertheless, the control rigidly clamps tension on cable 101, bearing such tension as compression along the length of members 114. In this manner, the caliper acts in a manner functionally similar to a bale or cam lock.

When the control is moved manually to the unlocking position by squeezing together the free ends of caliper legs 102 as in FIG. 10, the leverage of the user's manual squeezing force as applied against spring 126 increases from an initial minimum in the locking position of FIG. 9, where the spring exerts its maximum force, to a position where the user has more mechanical advantage and the spring has less, as shown in FIG. 10. The control is unlocked, tension on the cable is released, and the control is relatively easy to hold open.

The control extends the length of the line traversing the joints to release tension. This disengages all the axially displaceable rotational engagement surfaces and frees the joints simultaneously. Support platform 50 can be moved freely to a new position anywhere in a three dimensional range, as well as tilted, etc. The control is released at the new position to again hold the platform rigidly in place.

The joints 62, 64 in the foregoing embodiments are simply right angle elbow arrangements, with line 101 being arranged to pass through the respective rotational couplings 66 along the centers of their rotation axes. This requires that line 101 be guided through variable bends in two perpendicular planes. According to the alternative embodiment of FIGS. 11 and 12, and a further inventive aspect, a joint with an offset profile can be provided instead of a simple elbow. This offset arrangement has a reduced tendency to kink line 101, and has the further advantage that it enables adjacent articulated connecting arms 22 to be turned back relative to one another, e.g., by 180°. Thus, support arm 20 can be provided with two or more articulated arms that can be extended or folded back over a larger range between proximal end 182 and a chosen position of distal end 184. The cable guides 164 are disposed in a hub arrangement wherein the cable is diverted laterally from the longitudinal axis of each adjacent connecting arm 22, and the cable path bends smoothly to pass through the center or rotational axis of each rotational coupling 66. The stub portion 237 of at least one side of the laterally displaced joint in this embodiment follows a curve that offsets the next adjacent connecting arm to permit the joint to be turned back. More particularly, the axis of the connecting arm coupled to the offset stub portion 237 does not intersect the joint rotation axis and instead is offset by at least the width of the connecting arm, permitting the two adjacent connecting arms to be oriented substantially parallel to one another. This arrangement provides a large positional span but is particularly compact. For example, the span of a keyboard support can be sufficient to enable the keyboard to be used by a person who is either sitting or standing, and the offset joint arrangement still is compactly storable under the desk top or other base structure 30.

Figure 13:
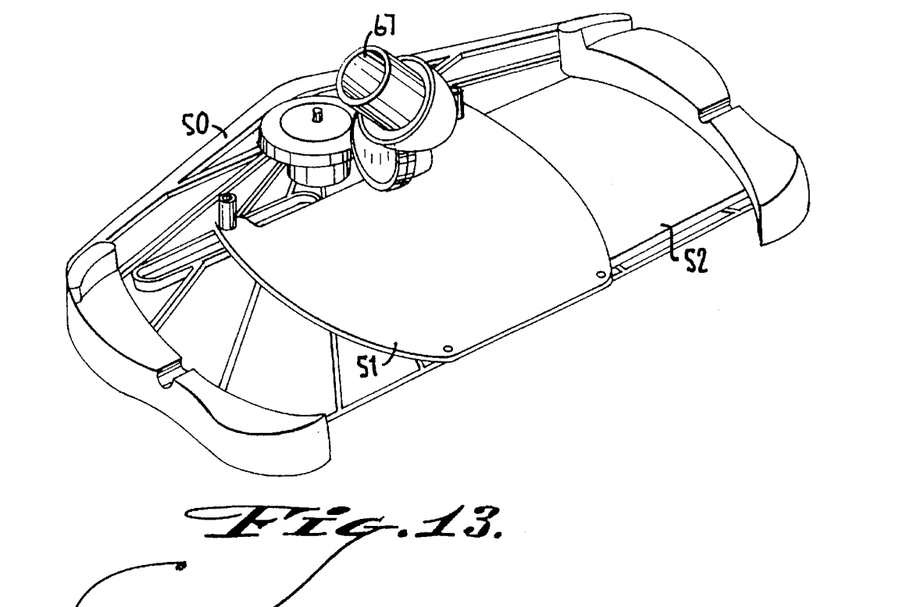
FIG. 13 is a perspective view of a preferred platform according to the invention, as seen from below.

The invention is advantageously applied to a movable keyboard support, but also can support or position other devices. FIG. 13 illustrates a preferred platform as adapted for a keyboard. Platform 50 has attached panel 51 for supporting lever 102, in this case formed by caliper 110. A movable shelf 52 resides in a slide fitting and can be extended laterally to support a pointing device (e.g., mouse or trackball) or the like, in close proximity to the keyboard. Other features, such as stops for the keyboard to rest against (not shown in FIG. 13), movable wrist supports 53 and the like can be included. Apart from keyboards, the device is useful for supporting electronic interface devices such as laptop computers, parts of such devices such as display monitors or the like, writing or work surfaces, lamps, receptacles for tools or supplies, and devices in general that may be desired for positioning at varying locations and orientations.

Figure 14:
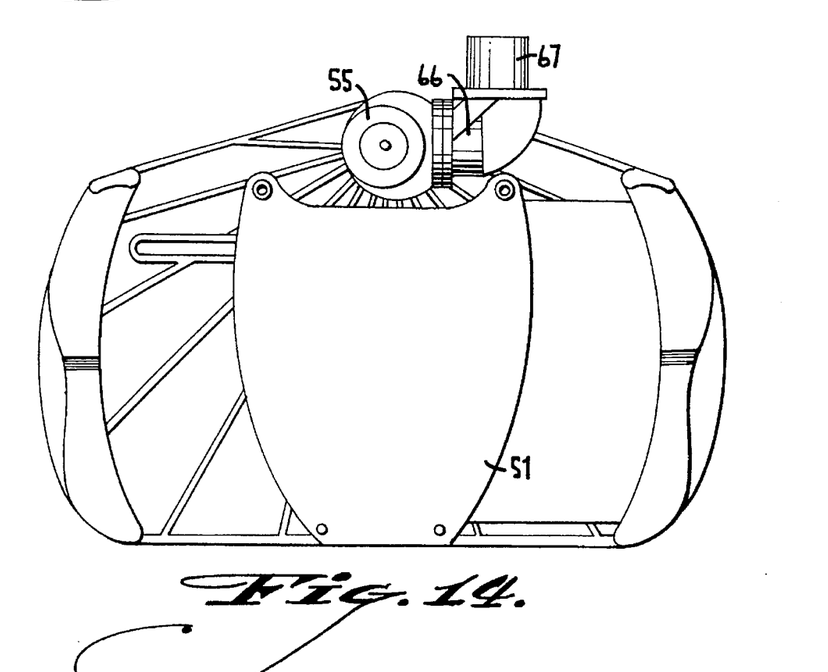
FIG. 14 is a bottom plan view of the platform of FIG. 13, showing a joint having three mutually perpendicular rotation axes.

FIG. 13 shows the support platform without its associated distal joint 64. FIG. 14 is a bottom plan view of the platform with the addition of joint 64, which together with the rotational coupling 55 in platform 50 provides a connection having three mutually perpendicular rotation axes.

Figure 15:
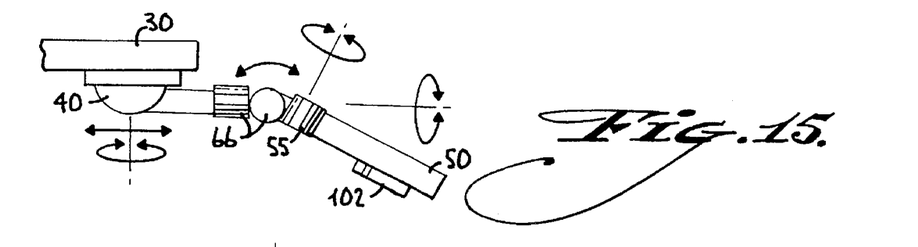
FIG. 15 is a side elevation view of an alternative embodiment having a short connecting arm, as appropriate for tilt adjustment.
Figure 16:
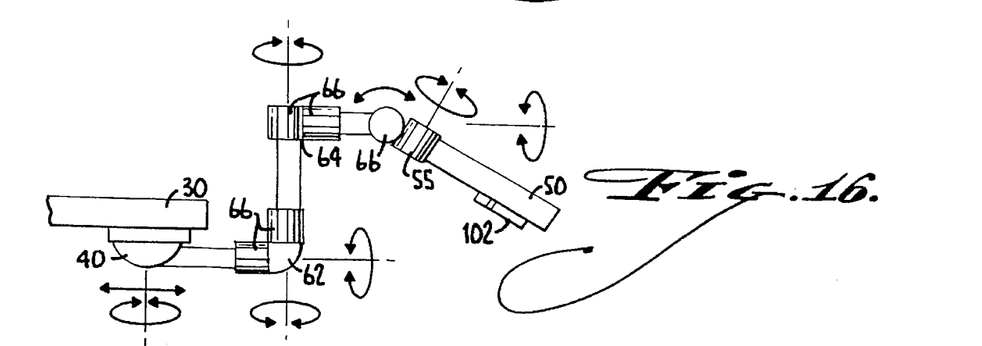
FIG. 16 is a side elevation view of a further alternative embodiment having a universal joint associated with the base element.
Figure 17:
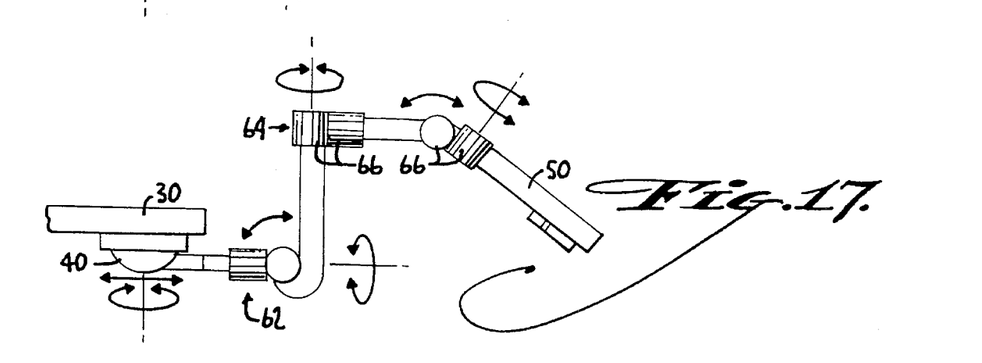
FIG. 17 is a side elevation view of an alternative embodiment having two relatively longer articulated connecting arms and an offset joint.
Figure 18:
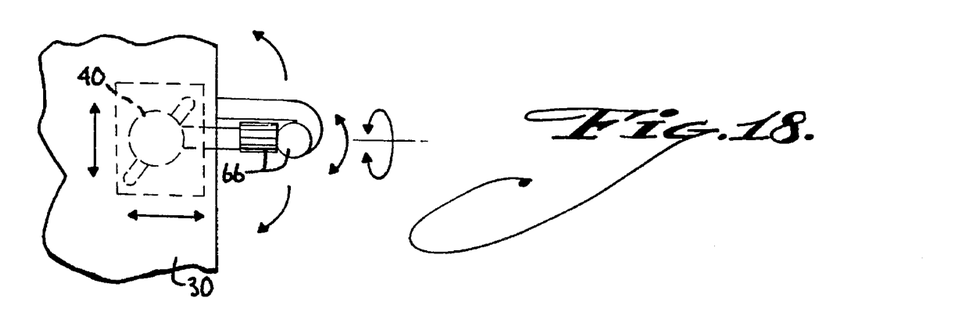
FIG. 18 is a top plan view of a preferred embodiment of a support configured as in FIG. 17, shown folded back on the offset joint.

FIGS. 15–17 illustrate the versatility of several alternative embodiments characterized by different spans of positioning possibilities due to different lengths and configurations of the connecting arm structures used. In FIG. 15, a short connecting arm is provided, as appropriate for tilt adjustment without the capability of moving the support far from the desk top or other base structure 30. FIG. 16 shows an alternative embodiment having a universal joint associated with the base element, providing additional span. FIG. 17 shows an alternative embodiment having two relatively long articulated connecting arms, which provide a large span of potential positions. The embodiment of FIG. 17 preferably provides a sufficient extension to enable the support platform to be conveniently positioned for a person who is either standing or sitting, and according to the foregoing locking technique is fixed rigidly where placed. This embodiment preferably uses the offset joint of FIGS. 11 and 12, as apparent from FIGS. 17 and 18. This long-extension embodiment is also appropriate for support arms on relatively low bases, for example attached to a short floor pedestal or to a weighted mobile pedestal from which the support arm is free standing.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A control for a support arm for movably positioning a surface relative to a base structure, the support arm being coupled to the base structure by at least one coupling that is rigidly lockable and unlockable by selective application of tension to a tension means along an axis, the control comprising:

lever means for manually applying tension to the tension means, the lever means mounted on a platform and placed for operation while manipulating the platform, the lever means being pivotably movable between a closed position and an open position for applying and releasing said tension, respectively;

spring means coupled to the lever means for normally biasing the lever means into the closed position;

at least one linkage coupled between the lever means and the tension means, the linkage having a member pivoted to the lever means, said member being coupled to the tension means at a point spaced from the lever means and being displaced by pivoting of the lever means laterally of the axis of the tension means, said member being guided by a first guide means from a position substantially parallel to the axis in the closed position, whereby tension along the axis applies tension along said member, and more pendicular to the axis in the open position, for clamping the tension means in the closed position.

2. The control of claim 1, wherein the lever means is one of two legs of a caliper, the legs being coupled at a pivot pin, and wherein the member is one of two members, each respectively coupled to one of the legs and to one another adjacent the tension means, such that the tension means is displaced along the axis.

3. The control of claim 2, wherein the lever means is fixed to an underside of the platform by a pivot pin.

4. The control of claim 3, further comprising a second linkage coupled to the lever means, the second linkage having a member pivoted to the lever means and coupled to the spring means at a point spaced from the lever means, and being displaced by pivoting of the lever means laterally of the axis of the tension means, said member of the second linkage being guided by a second guide means from a position more parallel to the axis in the open position and more perpendicular to the axis in the closed position, for biasing the lever means to the closed position, whereby a mechanical advantage exerted by the spring is greatest in the closed position.

5. The control of claim 4, wherein the member of the second linkage is one of two members, each respectively coupled to one of the legs of the caliper and to one another adjacent at the point of coupling to the spring means.

6. The control of claim 5, wherein the first linkage and the second linkage are operable to displace the points of connection of the tension means and the spring means in opposite directions, and wherein the members of the first linkage are substantially aligned parallel in the open position and the members of the second linkage are substantially aligned parallel in the closed position.

7. The control of claim 6, further comprising at least one guide slot on the platform, and wherein the guide slot is arranged to guide at least one point of connection of at least one of the tension means and the spring means relative to the lever means.

8. A manual control for an apparatus that is operable by selective application and release of tension to a line along an axis, the control comprising:

a caliper comprising two levers pivotable with one another at a pivot pin for manually applying and releasing the tension on the line, the caliper being pivotable between a closed position and an open position for applying and releasing said tension, respectively;

at least one linkage coupled between the levers and the line, including a first linkage on a first side of the pivot pin, the first linkage having two members, respectively pivoted to the levers and pivotally attached to one another between the levers so as to displace a pivotal attachment between the members along the axis by pivoting of the levers on the pivot pin, the line being coupled to the members adjacent to the pivotal attachment; and, an extension spring coupled to bias the levers into the closed position.

9. The manual control of claim 8, further comprising a second linkage coupled to the levers on an opposite side of the levers from the first linkage, the second linkage having two members respectively pivoted to the levers and pivotally attached to one another between the levers so as to displace a pivotal attachment between the members of the second linkage along the axis by pivoting of the levers on the pivot pin, the extension spring being coupled between the members of the second linkage adjacent to the pivotal attachment of the members of the second linkage and at a fixed point.

10. The manual control of claim 9, wherein the pivot pin is fixed on a support plate for the caliper, and further comprising a guide slot in the support plate aligned to the axis, at least one of the pivotal attachment points between the members of the first and second linkages comprising a protruding pin disposed in the guide slot.

11. The manual control of claim 10, wherein the spring is coupled between the pivotal attachment point of the second linkage and the pivot pin of the caliper.

12. The manual control of claim 9, wherein the members of the first linkage are movable between a closed position of the caliper wherein said members of the first linkage are substantially parallel to the axis and an open position at which said members are substantially perpendicular to the axis, tension on the line in the closed position being borne by compression along the members of the first linkage.

13. The manual control of claim 12, wherein the members of the second linkage in a closed position of the caliper are substantially perpendicular to the axis.

14. The manual control of claim 9, wherein the members of the second linkage in a closed position of the caliper are substantially perpendicular to the axis.

* * * * *